TWO INPUT-TWO OUTPUT LOGIC CIRCUIT FOR ELECTRONIC
SELECTORS USING THREE TRANSISTOR CONFIGURATION
Filed Sept. 13, 1960
Fig. 1.
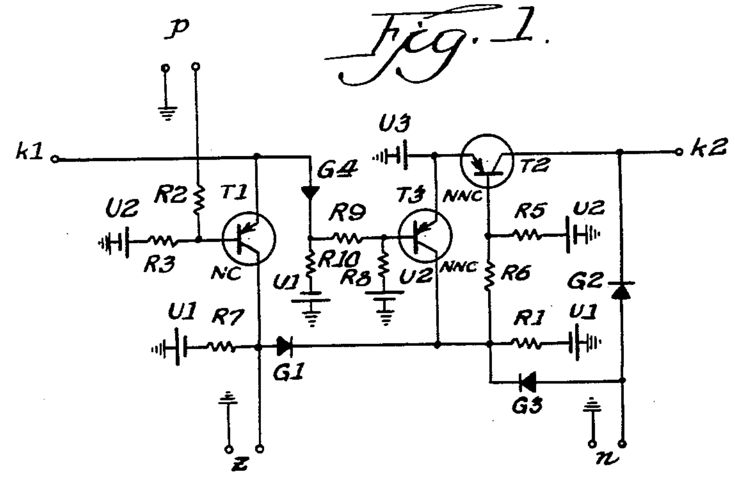
Fig. 2.
| INPUT k1 | INPUT p | OUTPUT k2 | OUTPUT z |
|---|---|---|---|
| + | − | − | + |
| + | + | + | − |
| − | − | − | − |
| − | + | − | − |
Fig. 3.
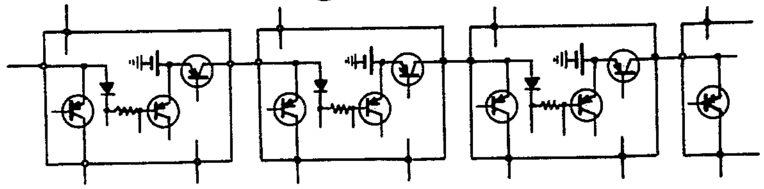
Fig. 4
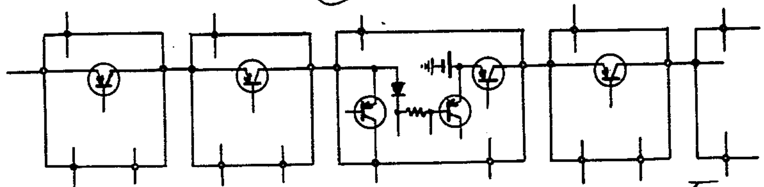
Inventors.
Otto Kneisel &
Sigmar Petry.
By [signature] Atty.

United States Patent Office 3,150,270
Patented Sept. 22, 1964

3,150,270

TWO INPUT-TWO OUTPUT LOGIC CIRCUIT FOR ELECTRONIC SELECTORS USING THREE TRANSISTOR CONFIGURATION

Otto Kneisel, Grosshesselohe, near Munich, and Sigmar Petry, Munich, Germany, assignors to Siemens & Halske Aktiengesellschaft Berlin and Munich, a corporation of Germany Filed Sept. 13, 1960, Ser. No. 55,786
Claims priority, application Germany Sept. 17, 1959
6 Claims. (Cl. 307—88.5)

This invention is concerned with an electronic selection control circuit of the type disclosed in copending application Serial No. 722,357, filed March 18, 1958, now Patent No. 3,051,793, dated August 28, 1962, which is owned by the assignee named in the present case.

The copending application discloses various embodiments of electronic circuits cooperatively related to a plurality of operating devices, any number of which may be busy, each of said electronic circuits serving to mark in a defined sequence the first idle operating device by connecting thereto a predetermined potential which differs as to magnitude or polarity from the potentials connected to the remaining operating devices. The selection circuit is for this purpose subdivided into stages corresponding in number to the number of operating devices cooperating therewith. Each operating device conducts to its respectively associated stage a potential the magnitude or polarity of which is indicative of its momentary operating condition (busy or idle condition) and receives from the corresponding stage a potential for effecting the marking thereof when such marking is indicated. The connection and the delivery of these two potentials is effected respectively over the testing input and the marking output of the respective stages of the selection circuit.

A chain circuit which extends through the entire selection circuit is of decisive importance for the functioning thereof. This chain circuit comprises means contained in the respective individual stages, each such means being directional with respect to its transmission properties and being operative to connect a coupling input with a coupling output of its stage. Upon interconnection of the stages to form a selection circuit, the chain circuit will effect connection of the coupling input of each stage (excepting the first stage) with the coupling output of the respectively preceding stage. Each stage can in this manner influence over this chain circuit the respectively directly successive stage and over the latter all successive stages. This influencing can be explained in simplest manner by observing that the stage which first receives from its respectively associated operating device a potential indicating idle condition, briefly referred to herein as "idle potential," gives off marking potential while preventing all succeeding stages from giving off marking potential. It will be seen, therefore, that the chain circuit is effective to produce unequivocal delivery of marking potential and to maintain at the same time a definite sequence or order of marking potential delivery.

The connection between the coupling input and the coupling output is in some of the embodiments disclosed in the above noted copending application effected by a transistor having its emitter connected with the coupling input and its collector with the coupling output. Current will flow through the transistor when the coupling input receives idle potential while the base thereof, which is connected with the testing input, receives potential indicating busy condition, hereinafter referred to as "busy potential." The transistor will in such case transmit the idle potential to the coupling output, thereby placing the respectively succeeding stage in a position to likewise deliver idle potential or to give off marking potential.

It may happen in connection with selection control circuits with a great number of switching stages which are interconnected in chain circuit, that the current load on the transistors disposed in the first stages respectively between the coupling input and the coupling output thereof, becomes excessive in the event that operating conditions are such that marking potential is to be given off only by one of the last switching stages in the chain, because these transistors in the first stages of the chain must transmit the current utilized in all of the succeeding switching stages. Another peculiarity that has sometimes been found disadvantageous in connection with selection control circuits with relatively great numbers of switching stages, resides in the fact that a voltage drop occurs along the chain circuit as a result of combined voltage drops at the emitter-collector paths of the transistors of switching stages at which idle potentials are delivered. The marking potential to be given off by a switching stage is derived from the idle potential conducted to such stage, and it will therefore be seen that such voltage drop will lead to a condition in which the marking potential given off, for example, by the last switching stage, will be lower than that given off, for example, by the first switching stage. This is in some cases undesirable.

The invention therefore is concerned with a switching stage of an electrical selector which comprises, first, a testing input for extending thereto a potential signifying the idle condition or the busy condition; second, a marking output for delivering a potential which signifies the neutral or the marking condition; third, a coupling input; and fourth, a coupling output respectively for the operative connection or delivery of a potential signifying the idle condition or the busy condition, respectively. More particularly, the invention is concerned with such a switching stage wherein the means operatively connected between the coupling input and the coupling output, comprises a transistor with a base, an emitter and a collector, which transistor permits current flow only in the direction of the coupling output.

It is the object of the invention to eliminate the previously mentioned detrimental potential difference between the coupling input and the coupling output which occurs in the case of direct insertion of the emitter-collector path of the transistor between coupling input and coupling output, and to restore instead a potential equilibrium. According to a further object of the invention, the current loading of the transistors of the first switching stages is to be reduced, particularly in long chain circuits heretofore containing switching stages in which the emitter-collector paths of the transistor have been connected directly between the coupling input and the coupling output.

It is characteristic for the switching stage according to the invention that the transistor is part of an amplifier, the output of which forms the coupling output and that the input of this amplifier is connected with the coupling input.

The above noted drawbacks are eliminated in the invention by the provision of a switching stage comprising a transistor for effecting the connection between the coupling input and the coupling output, wherein the idle potential to be given off at the coupling output is of exactly the same value as the idle potential conducted to the coupling input. According to another feature, the transistor which establishes the connection between the coupling input and the coupling output of the switching stage, forms part of an amplifier the input of which is connected with the coupling input while its output is connected with the coupling output.

Switching stages according to the invention can be realized in various ways. To give an example, an embodiment will now be described with reference to the accompanying drawing, wherein the giving off or delivery of the marking potential is effected by means of a transistor which controls the transistor forming the connection between the coupling input and the coupling output.

FIG. 1 shows an embodiment of the switching stage according to the invention;

FIG. 2 is a table showing the mutual allocation of the supplied and the delivered potentials of the switching stage according to FIG. 1;

FIG. 3 represents a simplified arrangement of an electronic selector constructed only of switching stages according to the invention; and FIG. 4 is a simplified representation of an electronic selector employing switching stages constructed according to the invention.

The example of the switching stage illustrated in FIG. 1 comprises two transistors T1 and T2 of the same conduction type, in the assumed case pnp-transistors, the emitter of the transistor T1 being connected to the coupling input *k1* while the emitter of the transistor T2 is connected to the positive pole of a voltage source U3. The collector of the transistor T1 is directly connected with the marking output *z* and over a resistor R7 with the negative pole of a voltage source U1, this transistor serving the purpose of conducting the marking potential to the marking output *z*. The base of the transistor T1 is connected with the testing input *p* over a resistor R2 and with the positive pole of a voltage source U2 over a resistor R3. The collector of the other transistor T2 is directly connected with the coupling output *k2*. As is explained more in detail in the previously noted copending application, the collector of the transistor T2 may additionally be connected over a resistor (not shown) with the negative pole of the voltage source U1. The base of the transistor T2 is over a resistor R5 connected to the positive pole of the voltage source U2 and over serially disposed resistors R6 and R1 to the negative pole of the voltage source U1. The point of interconnection between the resistors R6 and R1 is over a diode rectifier G1 connected with the marking output *z*. The diode rectifiers G2 and G3 which interconnect an auxiliary input *n* respectively with the coupling output *k2* and with the point of interconnection between the resistors R6 and R1, serve for electronically determining the null point with respect to the operative switching sequence or switching order of the switching stage included in the selection control circuit. The electronic determination of the null point is described in the copending application Serial No. 55,708, filed September 13, 1960, now Patent 3,063,922.

The partial arrangement of the switching stage, so far as described above, corresponds except for the connection of the emitter of the transistor T2 to the voltage source U3 instead of to the coupling input *k1*, to an embodiment described in the initially mentioned copending application Serial No. 722,357.

In the present embodiment, there is provided an additional transistor T3, the emitter of which is connected with the emitter of the transistor T2 while its collector is connected to the point of connection between the resistors R6 and R1. The base of the transistor T3 is over a resistor R8 connected with the positive pole of the voltage source U2 and over serially related resistors R9 and R10 to the negative pole of the voltage source U1. The point of connection between these resistors R9 and R10 is connected to the coupling input *k1* over a diode rectifier G4.

The base potentials for the transistors T2 and T3, which are determined by the voltage dividers formed respectively by the resistors R5, R6, R1 and resistors R8, R9, R10 and the voltage sources U2 and U1, are such that transistor T3 carries current and the transistor T2 would carry current in the absence of dependence on the transistor T3. The transistor T3 accordingly impresses on the point of connection between the resistors R1 and R6 its positive collector potential which is approximately equal to the positive potential delivered by the voltage source U3. The base potential of the transistor T2 is thereby shifted in positive sense, so that this transistor T2 is blocked.

As explained in detail in the initially noted copending application Serial No. 722,357, a switching stage, to meet the requirements posed therefor in a selection control circuit, must satisfy three criteria, namely, (1) when there is release potential on the coupling input and idle potential on the testing input, there shall be marking potential on the marking output and blocking potential on the coupling output; (2) when there is release potential on the coupling input and busy potential on the testing input, there shall be neutral potential on the marking output and release potential on the coupling output; and (3) when there is blocking potential on the coupling input, there shall be neutral potential on the marking output and blocking potential on the coupling output irrespective of the potential that may be on the testing input.

It will suffice, for an explanation of the operation of the switching stage, to show how and in what manner it satisfies the above noted three criteria as it will then be a simple matter to circuit such switching stage with other similarly constructed switching stages to form a selection control circuit. For reasons of simplicity, the two values which each potential may assume, will hereinafter be referred to as "positive" and "negative" potential, respectively. These two designations denote relative values as they always refer to an average value to be formed of the two values, such average value being in reciprocal dependence with respect to other potentials conducted to the switching stage, for example, transistor bias voltages. In a borderline case, one of the two potential values may even disappear, which means that the respectively involved input or output will not receive or deliver any defined potential. However, this borderline case does not represent an exception since it merely constitutes a simplification regarding the arrangement and since it may always be traced to the occurrence of a suitable defined potential.

In the embodiment to be explained in the following description, the release potential, the marking potential and the busy potential are positive, the idle potential and the neutral potential being negative, and the blocking potential resulting from the disappearance of a defined potential.

FIG. 2 shows in form of a table the mutual allocation of the supplied and delivered potentials in the four possible cases. The operation of the switching stage in these cases is hereinafter described.

When the positive release potential and the negative idle potential are respectively connected to the coupling input *k1* and the testing input *p*, the bias for the base of the transistor T1 extending over the resistor R3 is by the idle potential so strongly reduced that this transistor T1 is triggered into conducting condition, its collector potential, which is now positive, appearing as a marking potential at the marking output *z*. The release potential is also extended over the rectifier G4 to the voltage divider formed by the resistors R8, R9 and R10 and shifts the base potential of the transistor T3 sufficiently in positive sense so that this transistor is blocked. However, since the marking potential of the marking output *z* is at the same time extended over the rectifier G1 to the point of connection between the resistors R6 and R1, approximately the same potential conditions as in the case of current flow in the transistor 3 will be present at the voltage divider comprising the resistors R1, R6 and R5, and the transistor T2 will remain blocked. The absence of a defined potential at the coupling output *k2*, due to the blocked transistor T2, has the same effect as the appearance of a defined blocking potential.

When positive release potential is conducted to the coupling input $k1$ while positive busy potential is conducted to the testing input $p$, the busy potential will support the positive potential supplied from the voltage source U2 to the base of the transistor T1, thereby blocking this transistor, and the negative potential conducted to its collector from the voltage source U1 will appear as a neutral potential at the marking output $z$. The positive release potential, supplied over the rectifier G4 to the voltage divider formed by the resistors R8, R9 and R19, shifts the base bias of the transistor T3 so strongly in positive sense, that this transistor becomes blocked. The base of the transistor T2 thereby receives the bias which is determined only by the voltage divider formed by the resistors R1, R6, R5 and the voltage sources U1 and U2, such bias, as already described before, triggering the transistor T2 into conductive condition, whereby its positive collector potential is extended as a release potential to the coupling output $k2$.

When the coupling input $k1$ receives negative blocking potential or no defined potential, the transistor T1 will not be triggered into conducting condition, due to the absence of positive emitter potential, even in the presence of the negative idle potential at the testing input $p$, and the marking output $z$ will retain its negative potential as a neutral potential. The transistor T3 remains due to its fixed base bias in current conducting condition and thereby shifts the base potential of the transistor T2 so strongly in positive direction that this transistor T2 is blocked. The absence of a defined potential at the coupling output $k2$, as a consequence of the blocking of the transistor has the same effect as the appearance of a blocking potential. The rectifier G1 prevents erroneous appearance of the positive collector potential of the transistor T3 as a marking potential at the marking output $z$. Upon current flow through the transistor T3 there will be effected by the base current thereof, a voltage drop at the resistor R10 which, although slight, will shift the potential at the point of connection between the resistors R9 and R10 somewhat in positive sense; a weak current could accordingly flow in the transistor T1 responsive to connection of the negative idle potential to the testing input $p$, and such current would somewhat shift the neutral potential of the marking output $z$, which is otherwise determined only by the voltage source U1, likewise in positive direction. This tendency is however suppressed by the rectifier G4 which acts in blocking sense with respect to such potential shifting ocurring at the resistor R10.

It will be seen from the foregoing explanations that the switching stage according to the invention satisfies the three previously mentioned criteria and that such switching stage can therefore be directly utilized in selection control circuits. The advance resulting therefrom, namely, that no voltage drop occurs between the coupling input and the coupling output, is achieved by connecting the emitter of the transistor T2, which effects the connection between the coupling input $k1$ and the coupling output $k2$, not with the coupling input $k1$ but with the positive pole of the voltage source U3, and by controlling this transistor T2, for the transmission of the idle potential connected to the coupling input $k1$, by means respectively associated therewith, namely, by means of the transistor T3. Owing to the fact that the release potential to be given off or delivered by such a switching stage, included in a selection control circuit, is not derived from the release potential conducted to its respectively preceding switching stage, but from a fixed voltage source, namely, from the voltage source U3, there will obtain exactly identical potential conditions in all switching stages, and the marking potentials which are to be given off by the individual switching stages will accordingly be mutually completely identical.

Two possibilities are present for the use of the switching stage according to the invention. These two possibilities are explained in FIGS. 3 and 4. Both figures show electronic switches which are respectively constructed, as previously described, in a chain circuit of switching stages. Only the important parts which are required for the undertsanding of the invention are shown in simplified representation. First, a selection control circuit can be built up exclusively of identical switching stages as shown in FIG. 3. Such a selection control circuit can have a practically unlimited number of switching stages and will produce highest uniformity with respect to the marking potentials to be delivered by the individual stages. It is however also possible, as shown in FIG. 4, to subdivide the selection control circuit into partial chain circuits respectively built up by switching stages of the previously proposed kind, each partial chain circuit comprising a number of switching stages such that the voltage drop occurring therein remains within tolerable limits. Successive partial chain circuits are then interconnected by a switching stage of the kind disclosed herein. In the resulting selection control circuit, only the potential drops of the respective individual partial chain circuits will be additive, and not the potential drop of all stages, thus again giving the possibility to build up selection control circuits with practically unlimited number of switching stages. The freedom obtaining with regard to the number of stages in the respective partial chain circuits permits to keep the potential differences at values as low as desired.

Changes may be made within the scope and spirit of the appended claims which define what is believed to be new and desired to have protected by Letters Patent.

We claim:

1. A switching stage for use in connection with an electronic selection control circuit, comprising a testing input and a coupling input for respectively receiving potentials conducted thereto and having a marking output and a coupling output for respectively assuming potentials to be delivered thereby, and at which any one of said potentials can have two values, a transistor for establishing between the coupling input and the coupling output a connection which is operatively effective only in predetermined direction, said transistor forming part of an amplifier having an input and an output, means for respectively connecting said last named input and output respectively with said coupling input and with said coupling output, and means operatively connecting said testing input and marking output for delivering said marking potential and controlling said transistor.

2. A switching stage according to claim 1, wherein said transistor has emitter, collector and base electrodes, means for operatively connecting the emitter of said transistor to a positive potential, means for connecting the collector of said transistor with the coupling output, and means operatively connecting the base of said transistor and the coupling input for operatively controlling said transistor at least depending upon the potential conducted to the coupling input.

3. In a signalling system, a selection circuit having a plurality of switching stages, each of said switching stages having, first, a testing input for receiving a potential signifying idle or busy condition, second, a marking output for extending a potential signifying neutral condition or marking condition, third, a coupling input and, fourth, a coupling output for respectively receiving and extending a potential signifying release or blocking, each input and output having a pair of terminals one of which is grounded, and including an amplifier operatively connected to said coupling output for delivering the release potential, said amplifier comprising a transistor with an emitter, a collector and a base, the emitter being connected to the positive pole of a voltage source which delivers the release potential to the coupling output, and the negative pole of which is grounded, the collector serving as the amplifier output forming the coupling output, and the base serving as amplifier input being connected to the marking output, a second transistor for the delivery of the marking potential, said second transistor having an emitter, a collector and a base, the emitter being connected to the coupling input, the base being connected to the testing input and the collector being connected to the marking output, and a third transistor for the further control of the amplifier, said third transistor having an emitter, a collector and a base, the emitter of said third transistor being connected to the positive pole of the voltage source which delivers the release potential, the collector being connected by a rectifier to the marking output, and the base being connected to the coupling input, and means including resistors for conducting bias voltages to the bases of all transistors, whereby the first and third transistors are blocked upon extension of the release potential to the coupling input and potential indicating idle condition to the testing input.

4. A switching stage according to claim 3, comprising in further combination, a rectifier disposed between the emitter of said second transistor and the resistors serving for the extension of the bias voltage to the base of said third transistor.

5. A selection circuit containing switching stages according to claim 4, wherein each switching stage, with the exception of the first one, is connected with its coupling input to the coupling output of the respective preceding switching stage, whereby the switching stages form a chain circuit.

6. A selection circuit containing switching stages according to claim 4, wherein a given number of other cooperable switching stages is inserted between the respective switching stages, the connection between the coupling input and the coupling output of the further switching stages being effected by means of a transistor.

References Cited in the file of this patent

UNITED STATES PATENTS

| | | |
|---|---|---|
| 2,524,035 | Bardeen | Oct. 3, 1950 |
| 2,882,423 | MacSorley | Apr. 14, 1959 |
| 2,885,149 | Clapper | May 5, 1959 |
| 2,927,733 | Campbell | Mar. 8, 1960 |
| 2,928,049 | MacSorley et al. | Mar. 8, 1960 |
| 2,983,875 | Zechter | May 9, 1961 |